(12) United States Patent
Herrick

(10) Patent No.: US 7,671,265 B2
(45) Date of Patent: Mar. 2, 2010

(54) SYSTEM AND METHOD FOR TEACHING MUSIC THEORY

(76) Inventor: Mark Herrick, 12621 Lancaster Way, Holly, MI (US) 48442

( * ) Notice: Subject to any disclaimer, the term of this patent is extended or adjusted under 35 U.S.C. 154(b) by 26 days.

(21) Appl. No.: 12/165,813

(22) Filed: Jul. 1, 2008

(65) Prior Publication Data

US 2009/0007760 A1 Jan. 8, 2009

Related U.S. Application Data

(60) Provisional application No. 60/947,750, filed on Jul. 3, 2007.

(51) Int. Cl.
G09B 15/08 (2006.01)
(52) U.S. Cl. ........................................ 84/478
(58) Field of Classification Search .............. 84/470 R, 84/477 R, 471 R, 478, 479 R, 473–475
See application file for complete search history.

(56) References Cited

U.S. PATENT DOCUMENTS 7,184,701 B2 * 2/2007 Heslip .................... 434/307 R

* cited by examiner

*Primary Examiner*—Kimberly R Lockett
(74) *Attorney, Agent, or Firm*—Gifford, Krass, Sprinkle, Anderson & Citkowski, P.C.

(57) ABSTRACT

An instructional system for teaching music theory incorporates a human-readable harmony matrix which displays at least one repeat pattern of indicia corresponding to a particular placement of the notes of the twelve note scale. This pattern is arranged so that major or minor chords may be formed by rotations and/or inversions of a basic set of patterns. These patterns depict the interrelationship of the various chords. Transposition of chords from one key to another may be readily accomplished by moving the pattern across the matrix. The matrix pattern may also be used to depict and build chord progressions. The system operates to provide a two-dimensional representation of the relationship between musical tones and may be implemented in a variety of systems for teaching music theory.

19 Claims, 7 Drawing Sheets

FIG-1

Major Triad

Minor Triad

Major M6

Minor 7

Dominant 7

Minor 6

Major 7

Minor ♭6

Minor Major 7

Augmented +5

Suspended 2

Suspended 4

FIG - 7B  FIG - 7C

Diminished Triad

Diminished 7

Diminished +7

Major key Pattern

| +5 dim. | 7 dim. | 2 minor | 4 MAJOR |
|---|---|---|---|
| -2 dim. | 3 minor | 5 MAJOR | -7 MAJOR |
| -5 dim. | 6 minor | 1 MAJOR TONIC | -3 AUG |
| 7 dim. | 2 minor | 4 MAJOR | -6 dim. |

Major Scale Pattern

FIG - 9B

Melodic Minor Key Pattern

| 7 dim. | 2 minor | 4 MAJOR | -6 MAJOR |
|---|---|---|---|
| 3 minor | 5 MAJOR | -7 MAJOR | -2 MAJOR |
| 6 dim. | 1 MINOR TONIC | -3 AUG | -5 dim. |
| 2 minor | 4 MAJOR | -6 MAJOR | 7 dim. |

Melodic Minor Scale Pattern

FIG - 9C

Harmonic Minor Key Pattern

| 7 dim. | 2 dim. | 4 Minor | -6 MAJOR |
|---|---|---|---|
| 3 minor | 5 MAJOR | -7 MAJOR | -2 MAJOR |
| 6 dim. | 1 MINOR TONIC | -3 AUG. | -5 dim. |
| 2 dim. | 4 Minor | -6 MAJOR | -7 dim. |

Harmonic Minor Scale Pattern

FIG - 9D

Relative Minor Key Pattern

| 7 dim. | 2 minor | 4 minor | 6 MAJOR |
|---|---|---|---|
| 3 dim. | 5 minor | -7 MAJOR | -2 MAJOR |
| 6 dim. | 1 MINOR TONIC | -3 MAJOR | -5 AUG. |
| 2 dim. | 4 Minor | -6 MAJOR | 7 dim. |

Natural Minor Scale Pattern

SYSTEM AND METHOD FOR TEACHING MUSIC THEORY

RELATED APPLICATION

This application claims priority of U.S. Provisional Patent Application Ser. No. 60/947,750 filed Jul. 3, 2007, entitled "System and Method for Teaching Music Theory", which is incorporated herein by reference.

FIELD OF THE INVENTION

This invention relates to instructional materials and methods. More specifically, the invention relates to instructional materials and methods for teaching music theory. Most specifically, the invention relates to instructional materials and methods for teaching music theory through the use of a unique matrix display which creates visual and physical harmony objects that depict tonal relationships of musical notes and combinations of notes.

BACKGROUND OF THE INVENTION

Musical theory, including the tonal relationships between notes and chords, and concepts such as chord progressions and the like, embodies specific mathematical and tonal relationships. In many instances, the nature of these relationships is very difficult to explain and understand, even for skilled musicians who may "play by ear." Consequently, it has been difficult to teach these aspects of music theory to students, and in particular to young students.

As will be explained herein, the present invention comprises a system which presents a student with a uniquely organized set of instructional materials and aids, which illustrate the interrelationship of chords, tones and sounds in a series of patterns which may be readily, and instinctively, comprehended by the student. The system of the present invention may be implemented in various detectable modes including visual and/or tactile which operate to create harmony objects which can be readily comprehended by a student.

BRIEF DESCRIPTION OF THE INVENTION

Disclosed herein is an instructional system for teaching music theory. The system is based upon a human-readable matrix which displays indicia corresponding to the notes of the twelve tone scale. The indicia are arranged in a particular pattern, and the matrix is comprised of at least one repeat pattern. In particular instances, each unit of the matrix is uniquely colored, and, in some instances, related notes may be colored in related shades or tones. In other instances, the indicia may be tactilely detectable so that the system may be used by non-sighted persons.

In particular implementations, the system is used in conjunction with a real or simulated keyboard, and the keyboard may be coded by indicia and/or color so as to correspond to the members of the matrix.

The system may also include a set of pattern indicators, each corresponding to a unique pattern of members of the matrix wherein each of the patterns defines a grouping of notes which constitutes a chord. The pattern may be indicated by electronically activating members of the matrix, as for example by activating light sources associated therewith, or the patterns may be indicated by the use of cards or the like which include cutout or otherwise transparent portions which allow members of the matrix to be displayed when the card is placed thereupon. Each chord display may be correlated with an anthropomorphic character which aids the user in remembering the configuration of the chord pattern.

Also disclosed are methods for teaching music theory through the use of the system.

BRIEF DESCRIPTION OF THE DRAWINGS

FIG. 1 is a depiction of a harmony matrix which may be used in the practice of the present invention;

FIG. 7B is a matrix pattern corresponding to a Suspended 2 chord;

FIG. 7C is a matrix pattern corresponding to a Suspended 4 chord;

FIG. 8C is a matrix pattern corresponding to a Diminished +7 chord; and

FIGS. 9A-9D are a series of key scale harmony matrix patterns illustrating harmonic and melodic patterns of various tones and chords.

DETAILED DESCRIPTION OF THE INVENTION

Figure 2A:
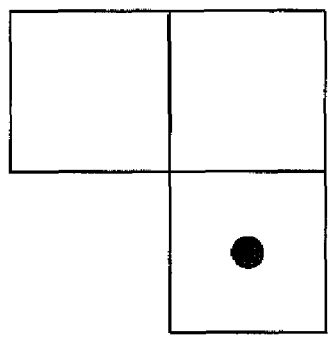
FIG. 2A is a depiction of a matrix pattern corresponding to a major triad.

The present invention is based upon a unique sound matrix in which chords and/or tones are displayed in a two-dimensional grid in a manner akin to the periodic table. This matrix, which can be referred to as a "Periodic Table of Applied Harmony," is organized in a manner such that chordal and tonal relationships may be depicted on the matrix as harmony matrix patterns each uniquely corresponding to a particular chord. As such, the matrix can be considered to be a Visual Harmony Display. Furthermore, rotations, inversions and reflections of the patterns allow for the conversion between major and minor sounds. Furthermore, displacement of the patterns on the matrix allows for transposition between musical keys. These patterns can thus represent chromatic harmonies as well as full harmonies.

Figure 1:
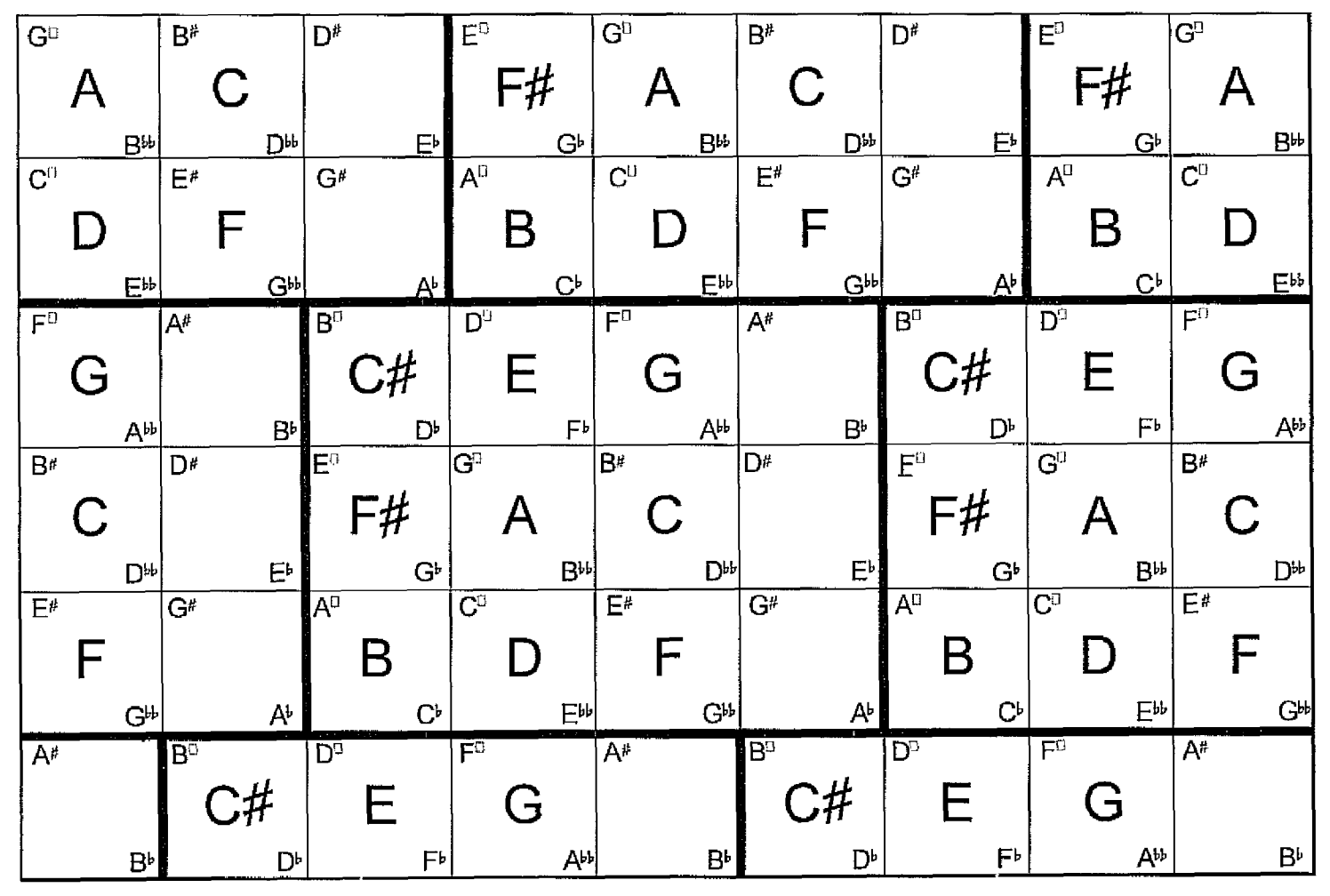

Referring now to FIG. 1, there is shown one depiction of a harmony matrix in accord with the present invention. This particular matrix is comprised of a grid of 6×9 squares tiled with a repeat pattern based upon a repeat unit of 12 squares arranged in a 3×4 matrix. The 12 squares of the 3×4 matrix correspond to the 12 notes of the 12 tonal system. In the FIG. 1 embodiment, one full repeat unit is shown, bounded in a bolded outline, in the approximate center of the depicted matrix. As will be noted, portions of 8 other repeat units are included in this matrix. It is to be understood that smaller or larger numbers of repeat units may be incorporated into a matrix, provided that at least one full repeat unit is included.

In the depicted matrix, the squares of the repeat units are labeled with the names of the 12 comprising notes. As is known to musicians, the various notes of the scale may each be referred to by different names. For example a C note may also be considered to be a B sharp note or a D double flat note while a C sharp note may be considered to be a D flat note or a B double sharp note. Likewise a D sharp note may be considered to be an E flat note, and so forth. The matrix of FIG. 1 is marked to show the various names of the notes; although, it is to be understood that a single nomenclature of each note may be likewise employed. Also, it is to be understood that while FIG. 1 shows the notes as being labeled in alphabetic form, other systems of labeling may be employed. For example, notes may be represented by tactile indicia such as Braille writing. Alternatively, other display systems may be employed.

In addition to, or instead of, varying graphic indicia, the squares of the matrix may be color coded so as to correspond to the various notes, and colors may be selected so that notes having harmonic or other tonal relationships are coded in similar colors. For example, the squares corresponding to the G note and the G sharp/A flat notes may be colored in blues, while the squares corresponding to the A and A sharp/B flat notes may be coded in greens. Similarly, the F sharp and F notes may be in values of red. Other such relationships may also be employed.

The harmony matrix may be used in conjunction with a functional or simulated piano keyboard, and in that regard, the keys of the keyboard may be marked so as to correspond to the various squares of the matrix by the use of colors and/or symbols and/or tactile indicia. The keyboard may be electronically connected to the matrix so that when a particular key is depressed, a given square on the matrix will light up or otherwise activate so as to indicate the note sounded by each key.

Figure 2B:
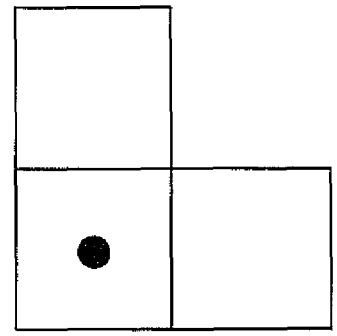
FIG. 2B is a depiction of a matrix pattern corresponding to a minor triad.

The harmony matrix of the present invention depicts the internal interrelationships between the notes in a unique manner which allows a student to develop an intuitive grasp of the harmonic relationships between notes, keys and chords. In that regard, the system of the present invention includes a set of pattern indicators which depict particular patterns of members of the matrix which constitute a grouping of notes which form a chord. Referring now to FIG. 2A, there is shown a matrix pattern which generates a major triad. As will be seen, the pattern of FIG. 2A includes a mark, in this case a dot, in one of the squares. If this dot is placed on a particular note, such as a C note, this pattern will correspond to a basic C major chord comprised of the C, G and E notes. If this pattern is reversed as in FIG. 2B, the corresponding minor triad will be selected, and in the case of the C minor chord this will comprise C, G, D sharp/E flat.

Likewise a pattern of three vertically stacked squares (Not illustrated) can depict primary chords of any major or minor key. In such a depiction the middle square will be the tonic of the chord. Such three square patterns can be incorporated into larger key scale patterns to represent still more complex chords.

Figure 3A:
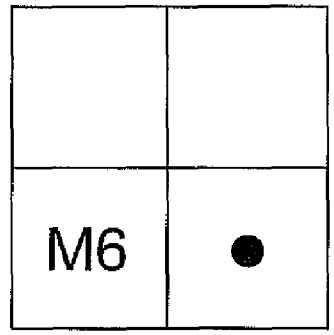
FIG. 3A is a matrix pattern corresponding to a Major 6 chord.
Figure 3B:
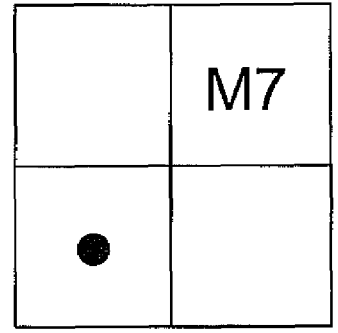
FIG. 3B is a matrix pattern corresponding to a Minor 7 chord.
Figure 4A:
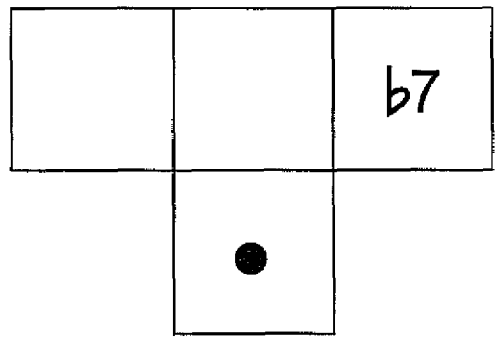
FIG. 4A is a matrix pattern corresponding to a Dominant 7 chord.
Figure 4B:
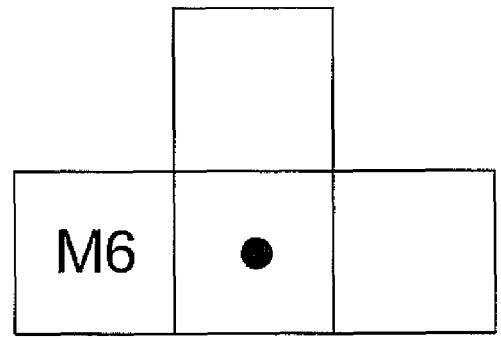
FIG. 4B is a matrix pattern corresponding to a Minor 6 chord.
Figure 5A:
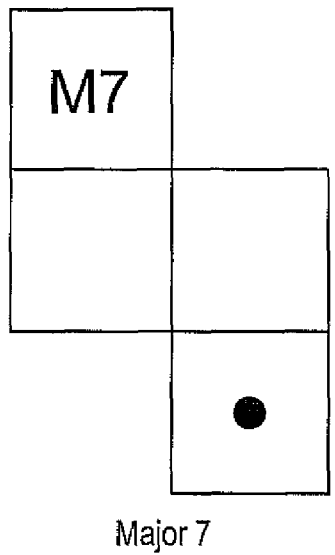
FIG. 5A is a matrix pattern corresponding to a Major 7 chord.
Figure 5B:
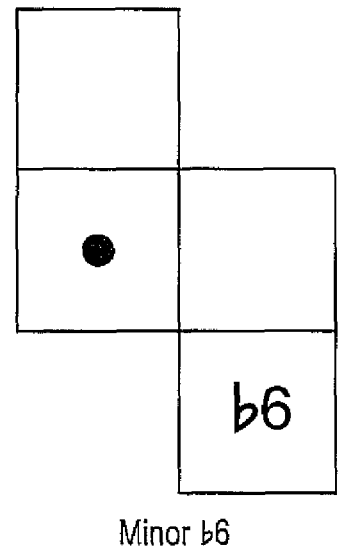
FIG. 5B is a matrix pattern corresponding to a Minor flat 6 chord.
Figure 6:
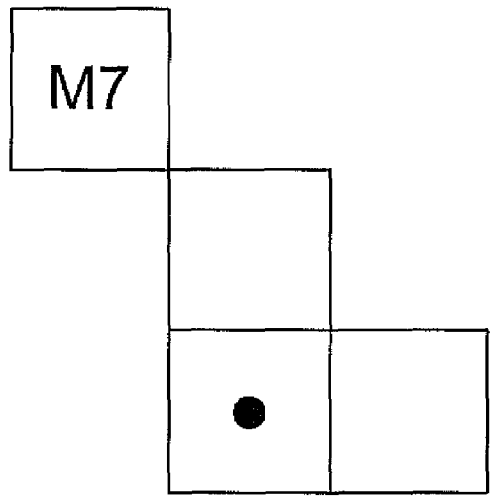
FIG. 6 is a matrix pattern corresponding to a Minor Major 7 chord.

Further chords may be built upon these basic matrix patterns. For example, FIG. 3A depicts the Major 6 chord while FIG. 3B depicts the corresponding Minor 7 chord. Likewise, FIG. 4A shows the major, Dominant 7 chord and FIG. 4B shows a pattern corresponding to the Minor 6 chord. FIG. 5A shows the Major 7 chord and FIG. 5B shows the Minor flat 6 chord. FIG. 6 depicts a pattern for the Minor Major 7 chord.

Figure 7A:
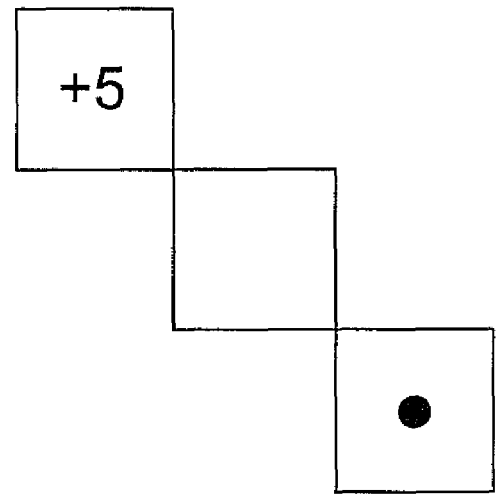
FIG. 7A is a matrix pattern corresponding to an Augmented +5 chord.

Various other patterns may be used to show other types of chords. For example, patterns corresponding to passing chords are shown in FIGS. 7A-7C wherein FIG. 7A is the Augmented +5 chord. FIG. 7B is the Suspended 2 chord and FIG. 7C is the Suspended 4 chord.

Figure 8A:
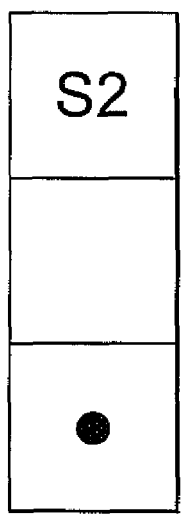
FIG. 8A is a matrix pattern corresponding to a Diminished Triad chord.
Figure 8A:
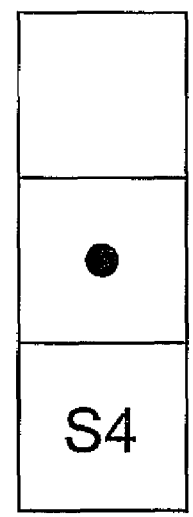
Figure 8A:
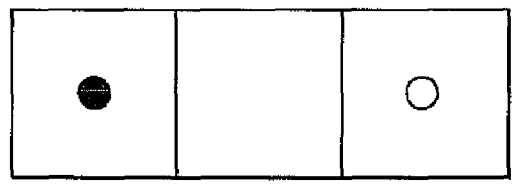
Figure 8B:
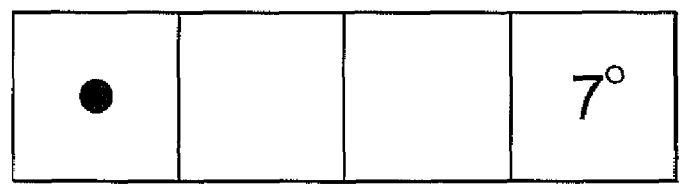
FIG. 8B is a matrix pattern corresponding to a Diminished 7 chord.

Patterns corresponding to minor passing chords are shown in FIGS. 8A and 8B wherein FIG. 8A is a Diminished Triad, FIG. 5B is the Diminished 7, and FIG. 5C is the Diminished +7. Yet other chord patterns may be depicted in a similar manner.

The chord patterns may be displayed in a number of ways. For example, overlay cards having cutout portions of segments of transparent material therein may be prepared and labeled to correspond to the various chords. These cards may be placed upon the matrix and used to illustrate the various chords. It will be understood that by moving these cards across the matrix, the chords may be transposed into different keys. For example, placing the indicator mark of the pattern onto the C note will generate the corresponding C chords, while moving it to another note such as the A note will then transpose those chords to the key of A.

The pattern indicators need not constitute cards. For example, the pattern indicators may comprise electronic data stored in the system which activates, as for example by illumination, various squares of the matrix to display a chord pattern.

In addition to generating chords, the matrix may be used to build chord progression. In that regard, each member of the matrix may also be considered to correspond to a particular chord and the matrix may be used to depict chord progressions, as well as displacements, which can establish harmonic and melodic relationships between chords and tones.

Figures 8C, 9A:
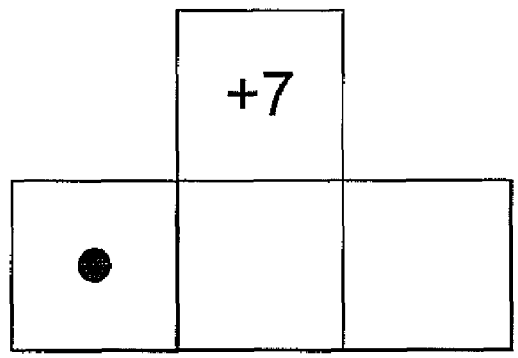

FIGS. 9A-9D are a series of charts illustrating the foregoing relationships. Specifically, these charts show key scale harmony matrix patterns illustrating related chromatic chord displacements. These charts are comprised of a series of squares, referred to as sound frames, and each is the equivalent of one scale tone and/or one complete chord. All the charts include portions of a larger matrix which is identical with regard to each of the charts. FIG. 9A is a chart illustrating major key patterns and major scale patterns; FIG. 9B is a corresponding chart illustrating melodic minor key patterns and melodic minor scale patterns; chart 9C illustrates harmonic minor key patterns and harmonic minor scale patterns, while chart 9D illustrates relative minor key patterns and natural minor scale patterns. It will be noted that charts 9B-9C all show the same arrangement of squares, while chart 9A is displaced in the overall matrix one row to the right.

In a system utilizing the illustrated charts, each chord is built upon a scale degree of the chromatic scale 1-12, and a plus sign indicates a raised scale degree in the key scale or an augmented plus five interval from the key's tonic one tone. A minus sign indicates a lowered scale degree in the key scale or a form of minor interval, or a diminished fifth interval. By utilizing these charts, or variants, the interrelationships of the various keys and scales are presented to a student in an intuitive manner.

The system may be readily adapted for particular teaching applications. In the instance where young children are being taught, each of the matrix patterns corresponding to the various chords may be coupled with a distinct anthropomorphic character which corresponds to the shape of the pattern. This will aid young children in developing an intuitive conception of the chord patterns.

The matrix display may be electronically activatable either through user input, a stored program or the like to automatically display selected sound patterns by illuminating appropriate members of the matrix. The matrix display may further produce sounds corresponding to the tones indicated on selected members of the matrix. For example, if a user touches a matrix member labeled as "A", the system will electronically play a sound corresponding to the "A" tone. This type of a display can operate in conjunction with an instructional program to provide an audiovisual display which illuminates and explains chordal and tonal relationships, chord progressions, transpositions, and other elements of music theory.

The display may be electronically integrated with the described keyboard. When a note is played on the keyboard, the corresponding matrix member may be illuminated. The system may further comprise a stored program whereby instruction and training is provided to the user through use of the matrix, the keyboard, or a combination thereof. For example, the program may instruct the user to play a certain chord on the keyboard, and upon correct input of the chord by the user, the program may illuminate the corresponding matrix members of the chord and congratulate the user for his successful completion of the instructions.

Alternate embodiments of the invention may allow the user to connect the matrix display and/or keyboard system to a computer. This connection may be via a variety of channels, including USB ports. The connection enables software loaded on the computer to be used in conjunction with the matrix display and/or keyboard system, and provides the user with a variety of applications such as games or tutorials. In some instances, the system may be implemented in an all-software version designed to run on a general-purpose computer, or on a dedicated device such as a gaming station or purpose-built device.

It will thus be appreciated that the system of the present invention may be implemented in a variety of configurations other than those specifically illustrated herein. Such modifications and variations will be readily apparent to those of skill in the art. Thus, it is to be understood that the foregoing drawings, discussion and description are illustrative of specific embodiments of the invention, but are not meant to be limitations upon the practice thereof. It is the following claims, including all equivalents, which define the scope of the invention.

The invention claimed is:

1. An instructional system for teaching music theory, said system comprising:
   a sound matrix grid including at least one two-dimensional repeat pattern of indicia corresponding to the notes of the twelve tone scale, said two-dimensional pattern comprising:

| | | | | | |
|---|---|---|---|---|---|
| C♯ | E | G | A♯ | | |
| | | | | B♭ | |
| F♯ | A | C | D♯ | | |
| | | | | E♭ | |
| B | D | F | G♯ | | |
| | | | | A♭ | | and a simulative or operative piano keyboard, wherein the keys of said keyboard have indicia thereupon corresponding to the members of the matrix.

2. The system of claim 1, wherein said repeat pattern further comprises

| | | | | | | | | | | | |
|---|---|---|---|---|---|---|---|---|---|---|---|
| Bx | | Dx | | | Fx | | | | A' | | |
| | C♯ | | | E | | | G | | | | |
| | | D♭ | | | | F♭ | | | A♭ | | B♭ |
| Ex | | Gx | | A | B♯ | | | C | | D♭ | |
| | F♭ | | | | | | B♭ | | | | |
| | | G♭ | | | | | | | D♭ | | E♭ |
| Ax | | Cx | D | | | E♯ | | F | | G♯ | |
| | B | | | | | | | | | | |
| | | C♭ | | | E♭ | | | | G♭ | | A♭. |

3. The system of claim 1, wherein each unit of the repeat pattern is uniquely colored.

4. The system of claim 3, wherein the keys of said keyboard have colors corresponding to the color of members of the matrix.

5. The system of claim 1, wherein said keyboard and said matrix display are electronically integrated.

6. The system of claim 1, further comprising a computer program operative to provide training and instruction to the user through use of the combination of said electronically integrated keyboard and matrix display.

7. The system of claim 1, wherein said system is configured to be connected to a computer.

8. The system of claim 1, wherein said system comprises a software program operable in combination with a human-readable display.

9. A method of teaching music theory, said method comprising utilizing the system of claim 1.

10. An instructional system for teaching music theory, said system comprising:
    a sound matrix grid including at least one two-dimensional repeat pattern of indicia corresponding to the notes of the twelve tone scale, said pattern comprising:

| | | | | | |
|---|---|---|---|---|---|
| C♯ | E | G | A♯ | | |
| | | | | B♭ | |
| F♯ | A | C | D♯ | | |
| | | | | E♭ | |
| B | D | F | G♯ | | |
| | | | | A♭ | | and a set of pattern indicators, each indicator corresponding to a unique pattern of members of the matrix wherein each of said patterns defines a grouping of notes which constitutes a chord.

11. The system of claim 10, wherein said pattern indicators comprise a plurality of cards, each card having one of said patterns depicted thereupon.

12. The system of claim 10, wherein said pattern indicators comprise a series of cards, each card having a unique transparent pattern defined therein, said transparent patterns each corresponding to a chord, each card being configured so that when laid onto the matrix, the members of the matrix displayed through the transparent pattern will constitute a chord.

13. The system of claim 10, wherein the members of said matrix are selectably illuminatable, and wherein the pattern indicators comprise unique patterns of illumination of the members of said matrix.

14. The system of claim 10, further including a chart depicting chord progressions.

15. The system of claim 10, further including an instruction manual.

16. The system of claim 10, further including an audio and/or visual recording.

17. The system of claim 10, further including a display of generally anthropomorphic characters, each corresponding to a particular chord.

18. The system of claim 10, wherein the members of said matrix each include tactilely readable indicia thereupon so that said matrix may be interpreted by non-sighted persons.

19. The system of claim 10, wherein, upon activation by the user, the members of said matrix may produce audible sound corresponding to their labeled tone.

* * * * *